O. M. PURCELL.
NECK YOKE OR WHIFFLETREE COUPLING.
APPLICATION FILED DEC. 28, 1912.
1,066,947.
Patented July 8, 1913.
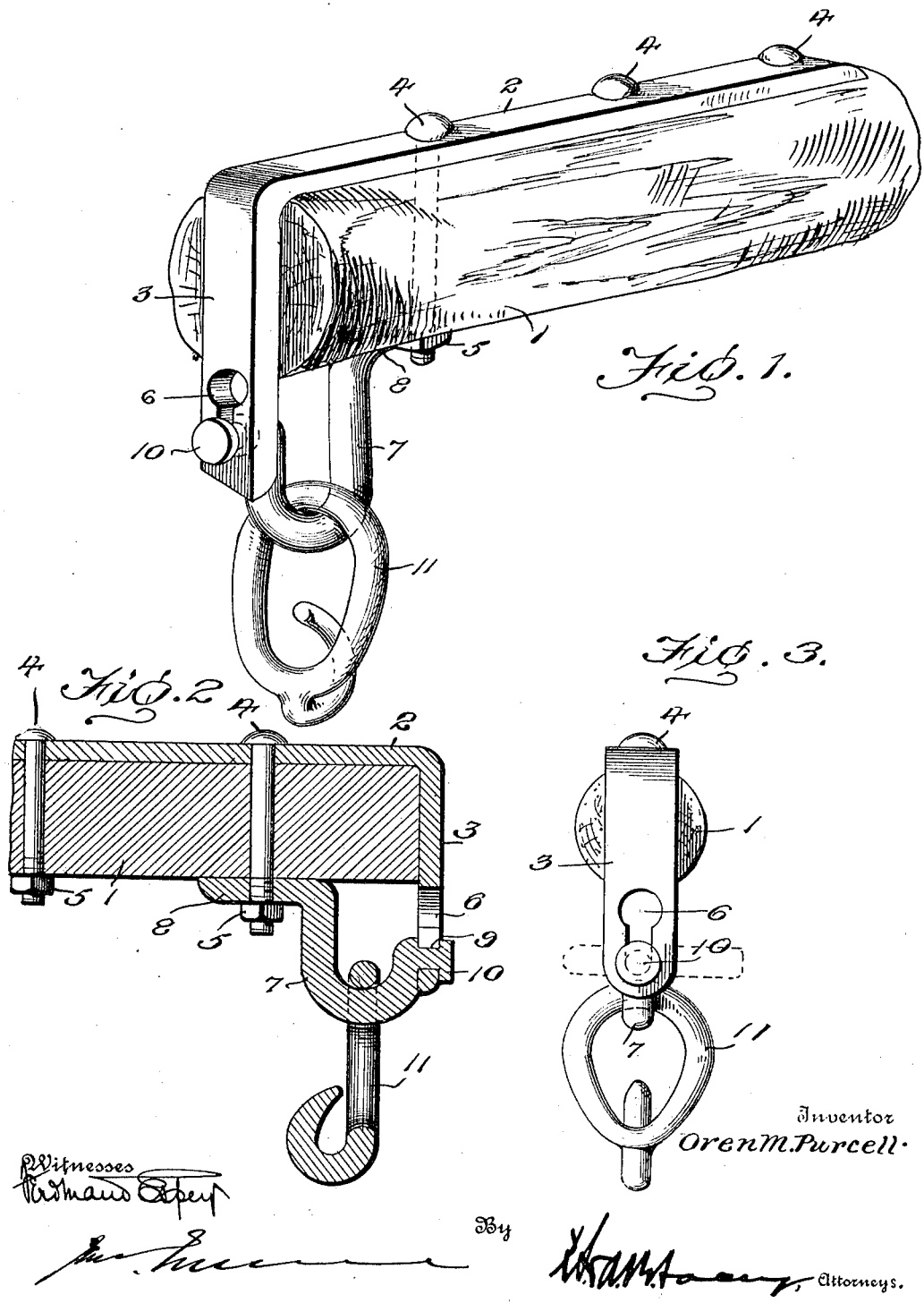

UNITED STATES PATENT OFFICE.

OREN M. PURCELL, OF SWEET WATER, TEXAS, ASSIGNOR OF ONE-HALF TO JOHN M. GREENE, OF SWEET WATER, TEXAS.

NECK-YOKE OR WHIFFLETREE COUPLING.

1,066,947.  Specification of Letters Patent.  Patented July 8, 1913.

Application filed December 28, 1912.  Serial No. 739,159.

*To all whom it may concern:*

Be it known that I, OREN M. PURCELL, citizen of the United States, residing at Sweet Water, in the county of Nolan and State of Texas, have invented certain new and useful Improvements in Neck-Yoke or Whiffletree Couplings, of which the following is a specification.

This invention has reference to neck-yoke or whiffle-tree couplings, and the object of the invention is to provide a cheap interchangeable device whereby a new coupling may be easily and quickly applied to a neck-yoke, whiffle-tree or similar structure, when the coupling in use has been worn through or should happen to be broken, without any loss of time and without requiring the provision of a new neck-yoke or whiffle-tree. This stated object, and such other incidental objects as will appear from the description hereinafter given, are attained in a device of the character illustrated in the accompanying drawings, and the invention consists in certain novel features which will be particularly pointed out in the claims following the description.

In the drawings: Figure 1 is a perspective view of the end of a neck-yoke or whiffle-tree having my improved coupling applied thereto; Fig. 2 is a longitudinal section; Fig. 3 is an end view.

The neck-yoke or whiffle-tree 1 is of the usual construction, and to the same at the end thereof I secure a longitudinally extending bar 2 having its end turned down, as shown at 3, to extend diametrically across and beyond the end of the whiffle-tree or neck-yoke. A plurality of bolts 4 are inserted through the bar 2 and the neck-yoke or whiffle-tree body and are equipped with securing nuts 5, as will be readily understood. The free extremity of the bent end 3 is provided with a key-hole slot 6 adapted to receive the headed end of a coupling bar 7. This coupling bar 7 consists of a substantially U-shaped intermediate portion from which extends an arm 8 suitably perforated to fit over the end of the bolt 4 nearest the end of the body 1 so that, if the nut 5 on said bolt be turned home against the said arm, the coupling will be securely clamped to the said body. The opposite end of the coupling is constructed with an annular groove 9 whereby a head 10 is formed on the extremity of the coupling body and a whiffle-tree hook or other attaching device 11 is hung upon the intermediate U-shaped portion of the coupling, as shown.

In applying my device to the body 1, the bar 2 is secured in place and the head 10 of the coupling 7 is then inserted through the upper circular end of the key-hole slot 6, the coupling body being turned transversely to the body 1, as indicated by dotted lines in Fig. 3. The coupling is then slipped down to the lower end of the slot 6, whereupon the walls of the groove 9 will engage the straight sides of the slot and the head 10 with the main portion of the body will overlap the said walls so as to hold the coupling body against longitudinal movement. The said coupling is then swung about the head 10 as a center so that the arm 8 will be brought against the under side of the body 1 with the perforation in said arm registering with the bolt hole in the body 1. The bolt 4 is then inserted and the nut 5 turned home to secure the device in place.

It will be readily seen from the foregoing description, taken in connection with the accompanying drawings, that I have provided an exceedingly simple device by which a draft hook 11 may be securely attached to a whiffle-tree or neck-yoke, and, should the said hook be broken or worn through, it may be easily removed and a new hook substituted. Should the coupling 7 be worn through or broken a new one may be substituted therefor in a few minutes without any delay in the use of the vehicle or other article to which the coupling is attached. In removing a broken or worn out coupling, the bolt 4 is withdrawn, after which the coupling is turned through a quarter of a circle to a position indicated in dotted lines in Fig. 3, after which the coupling may be raised so as to permit its withdrawal through the upper circular end of the key-hole slot. The hook 11 may be disengaged from the coupling body, either before or after its release from the bar 2.

My device is exceedingly simple and can be manufactured at a trifling cost so that a quantity may be kept on hand ready to meet emergencies.

What I claim is:—

1. The combination with a neck-yoke, of an attaching member having a longitudinal slot formed with a recessed portion at its inner end, a coupling member having one end engaging said slot and having a portion extending across the slot to prevent movement of the coupling member transversely of the slot at the outer end thereof, and means to secure said coupling member to the neck-yoke whereby it will be normally held to the outer end of the slot.

2. The combination with a neck-yoke, of an attaching bar having one end extended across the end of the neck-yoke and provided with a key-hole slot, a coupling body having one end constructed to engage said slot and its other end adapted to be clamped to the neck-yoke.

3. The combination with a neck-yoke, of an attaching bar having a key-hole slot in one end, a coupling body having an intermediate hook-carrying portion and provided at one end with an arm adapted to bear against the neck-yoke and having its other end constructed to engage the key-hole slot in the attaching bar, and a securing bolt inserted through the attaching bar, the neck-yoke and the arm of the coupling body.

4. The combination with a body, of an attaching bar secured longitudinally to the body and having one end extended across the end of the body and laterally beyond the same, a key-hole slot being formed in the laterally extended portion, and a coupling having an intermediate U-shaped portion, an arm extending from one side of the U-shaped portion to bear against and be secured to the body and a head at the opposite side of the U-shaped portion with an annular groove adjacent the same to engage the key-hole slot.

In testimony whereof I affix my signature in presence of two witnesses.

OREN M. PURCELL. [L. S.]

Witnesses:
S. R. REANIS,
R. C. DARR.

---

Copies of this patent may be obtained for five cents each, by addressing the "Commissioner of Patents, Washington, D. C."